(12) United States Patent
Kono et al.

(10) Patent No.: US 8,239,127 B2
(45) Date of Patent: Aug. 7, 2012

(54) CAR NAVIGATION SYSTEM

(75) Inventors: Toshiaki Kono, Ashford (GB); Takumi Fushiki, Hitachi (JP)

(73) Assignee: Clarion Co., Ltd., Tokyo (JP)

( * ) Notice: Subject to any disclaimer, the term of this patent is extended or adjusted under 35 U.S.C. 154(b) by 56 days.

(21) Appl. No.: 12/805,838

(22) Filed: Aug. 20, 2010

(65) Prior Publication Data
US 2011/0060517 A1    Mar. 10, 2011

(30) Foreign Application Priority Data
Sep. 4, 2009    (JP) .................................. 2009-204237

(51) Int. Cl.
*G06F 19/00* (2011.01)
(52) U.S. Cl. ...................................................... 701/123
(58) Field of Classification Search .................. 701/22, 701/104, 123, 400, 410
See application file for complete search history.

(56) References Cited

U.S. PATENT DOCUMENTS

| | | | | |
|---|---|---|---|---|
| 5,913,917 A | * | 6/1999 | Murphy | 701/123 |
| 7,493,209 B1 | * | 2/2009 | Altrichter et al. | 701/202 |
| 2005/0055157 A1 | * | 3/2005 | Scholl | 701/207 |
| 2009/0082952 A1 | | 3/2009 | Narita et al. | |

FOREIGN PATENT DOCUMENTS

| | | |
|---|---|---|
| JP | 2006-118479 | 5/2006 |
| JP | 2008-020382 | 1/2008 |

* cited by examiner

*Primary Examiner* — Kim T Nguyen
(74) *Attorney, Agent, or Firm* — Antonelli, Terry, Stout & Kraus, LLP.

(57) ABSTRACT

A car navigation system solves the problem that the emission test cycle fuel consumption rate indicates the energy consumption per unit distance covered following a prescribed emission test cycle procedure, and therefore, cannot produce a highly accurate prediction value reflecting the landform and the traffics along a route. So, the test cycle characteristic values independent of the vehicle model for vehicle energy consumption in a specified running condition are calculated, and the vehicle energy consumption parameter of the engine or the motor is estimated from the basic vehicle specifications such as the vehicle weight, the power supply type, the emission test cycle fuel consumption rate, the test cycle characteristic values in the emission test cycle and the vehicle characteristics. Using the basic vehicle specifications and the energy consumption parameter, the energy consumption is predicted taking the landform and traffics into consideration.

12 Claims, 14 Drawing Sheets

FIG.2

| EMISSION TEST CYCLE MODE: MODE A | | | |
|---|---|---|---|
| STEP i | RUNNING TIME T [sec] | RUNNING SPEED V [km/h] | GRADIENT $\theta$ [RADIAN] |
| 1 | 0 | 0 | 0 |
| 2 | 1 | 0 | 0 |
| 3 | 2 | 2 | 0 |
| 4 | 3 | 5 | 0 |
| 5 | 4 | 6 | 0 |
| ⋮ | | | |
| 599 | 598 | 3 | 0 |
| 600 | 599 | 1 | 0 |
| 601 | 600 | 0 | 0 |

| EMISSION TEST CYCLE MODE: MODE B | | | |
|---|---|---|---|
| STEP i | RUNNING TIME T [sec] | RUNNING SPEED V [km/h] | GRADIENT $\theta$ [RADIAN] |
| 1 | 0 | 0 | 0 |
| ⋮ | | | |

FIG.3

| EMISSION TEST CYCLE MODE | EMISSION TEST CYCLE DATA | | |
|---|---|---|---|
| | REQUIRED TIME TT [sec] | RUNNING DISTANCE L [m] | DRIVING CHARACTERISTIC VALUE K [J/kg] |
| MODE A | 600 | 4000 | 1200 |
| MODE B | 1200 | 7500 | 2300 |

FIG.5

| LINK NO. | LINK LENGTH [m] | ROAD CLASS | LINK COORDINATE (LATITUDE/LONGITUDE) | | CONNECTED LINK NO. | | HEIGHT DIFFERENCE BETWEEN LINK STARTING AND ENDING POINTS |
|---|---|---|---|---|---|---|---|
| | | | LINK STARTING POINT | LINK ENDING POINT | LINK STARTING POINT | LINK ENDING POINT | |
| 1 | 500 | ORDINARY ROAD | W139.134 N36231 | W139.144 N36241 | 3,5 | 9,10 | 10 |
| 2 | 300 | ORDINARY ROAD | W139.133 N36215 | W139.136 N36221 | 5 | 6 | 0 |
| 3 | 1000 | EXPRESSWAY | W139.054 N36231 | W139.134 N36231 | 4 | 1 | -10 |
| ... | | | | | | | |

FIG.7

(a)
SELECT EMISSION TEST CYCLE MODE
- MODE A
- MODE B
- MODE C (b)
INPUT FUEL CONSUMPTION RATE FOR MODE A
- MODE A _____ km/L
- MODE B
- MODE C

[7][8][9][ENTER]
[4][5][6][DELETE]
[1][2][3]
[0][.]

FIG.8

SELECT MOTIVE POWER SUPPLY TYPE
- HIGH-OCTANE GASOLINE ENGINE VEHICLE
- REGULAR GASOLINE ENGINE VEHICLE
- DIESEL ENGINE VEHICLE
- ELECTRIC VEHICLE

| MOTIVE POWER SUPPLY TYPE | RELATION α BETWEEN DISPLACEMENT AND BASIC CONSUMPTION COEFFICIENT [J/cc] | ENERGY EQUIVALENT H [J/L] OR [J/Wh] |
|---|---|---|
| HIGH-OCTANE GASOLINE ENGINE | 0.00015 | 35100000 |
| REGULAR GASOLINE ENGINE | 0.00010 | 34000000 |
| DIESEL ENGINE | 0.00012 | 30000000 |
| ELECTRIC VEHICLE | – | 3600 |

| ITEM | | SETTING |
|---|---|---|
| BASIC VEHICLE SPECIFICATIONS | VEHICLE WEIGHT W | 1650 kg |
| | EMISSION TEST CYCLE MODE | MODE A |
| | EMISSION TEST CYCLE FUEL CONSUMPTION RATE R | 13.5 km/L |
| | MOTIVE POWER SUPPLY TYPE | REGULAR GASOLINE |
| | DISPLACEMENT D | 2000 cc |
| VEHICLE ENERGY CONSUMPTION PARAMETER | BASIC CONSUMPTION COEFFICIENT F | 0.5 cc/sec |
| | ENERGY CONVERSION EFFICIENCY E | 0.3 |

CAR NAVIGATION SYSTEM

INCORPORATION BY REFERENCE

The present application claims priority from Japanese application JP 2009-204237 filed on Sep. 4, 2009, the content of which is hereby incorporated by reference into this application.

BACKGROUND OF THE INVENTION

This invention relates to a car navigation system for predicting the energy consumption of an automotive vehicle.

With the environmental problem becoming more and more serious, the efficient use of energy for vehicles is required. In view of this, demand has increased for an application of a car navigation system which can search for a route minimizing the energy consumption. Such an application requires a technique for predicting the amount of energy consumed along the route searched for. Incidentally, the energy consumption described herein includes the consumption of electric energy for an electric vehicle, the fuel consumption for a gasoline engine vehicle or a diesel engine vehicle and the amount of energy consumed by each motive power supply for a vehicle using a plurality of motive power supplies.

The factors determining the energy consumption of a vehicle are considered to include the landform, the traffics, the vehicle parameters, etc. Especially, the vehicle parameters have a great effect on the energy consumption, and therefore, are required to be reflected in the prediction of energy consumption. The vehicle parameters are considered to include the vehicle weight, the characteristics of energy consumption of the engine or the motor, as the case may be.

Roughly, two main methods are considered for predicting the energy consumption reflecting the vehicle parameters. One method is based on the actual energy consumption of a vehicle on the move. According to this method, the amount of energy consumed by a vehicle involved or a vehicle of the same type running along a road is recorded, and the energy consumption is predicted based on the record. Examples of this method are the inventions described in JP-A-2006-118479 and JP-A-2008-20382.

According to the other method, the energy consumption is predicted based on a physical model indicating the amount of energy consumed. In this method, the energy consumption is predicted for various models of vehicles, and therefore, the user is required to set, in the car navigation system in advance, the vehicle parameters required for energy consumption prediction. As one of the information indicating the energy consumption of a vehicle, the fuel consumption rate for emission test cycles is well known. The fuel consumption rate for emission test cycles is a measurement of the energy consumption of a vehicle running in a predetermined emission test cycle, and indicates the amount of energy consumed for a predetermined distance or the distance covered with a predetermined energy consumption. The procedure for emission test cycle and the fuel consumption rate for the emission test cycle are in public domain, and therefore, the user can predict the energy consumption by multiplying the distance to be covered.

In the method of predicting the energy consumption based on the actual energy consumption of a vehicle on the move, the energy consumption can be predicted only for a road on which the running result for the vehicle involved and other vehicles of the same model as the vehicle involved can be obtained. In some cases, therefore, the route for minimum energy consumption may not be found.

In the case where the energy consumption is predicted using a physical model, on the other hand, the user is required to set the vehicle parameters in advance for the vehicle involved as described above. It is difficult for the user, however, to set the parameters for the engine or the motor which requires the special knowledge, and the user has no choice but to set the vehicle parameters based on the information generally available from the catalog of the vehicle involved or the information acquired from the sensors mounted on the vehicle.

The generally available information on the vehicle energy consumption includes the emission test cycle fuel consumption rate used conventionally, and based on this information and the distance covered, the energy consumption can be predicted. The emission test cycle fuel consumption rate, however, represents the value of energy consumption for the distance covered according to a prescribed emission test cycle procedure, and therefore, a highly accurate prediction value reflecting the landform and the traffics along the running route cannot be obtained from the value of the emission test cycle fuel consumption rate. Thus, the problem is posed that it is difficult to search for a route minimizing the energy consumption accurately.

SUMMARY OF THE INVENTION

In order to solve this problem, an object of this invention is to provide a car navigation system for predicting the fuel consumption rate along a route found by search using the fuel consumption rate information in a predetermined emission test cycle, the system comprising:

a test cycle characteristic value storage means for storing the test cycle characteristic value as a theoretical value of fuel or electric energy consumption of a vehicle according to the running conditions in the emission test cycle;

a basic vehicle specification setting means for accepting the input of the basic vehicle specifications including the weight and the emission test cycle fuel consumption rate for the vehicle involved;

an energy consumption characteristic calculation means for estimating the vehicle energy consumption parameter of a vehicle engine or motor from the test cycle characteristic value and the basic vehicle specifications;

an energy consumption prediction means for predicting the energy consumption for each road link using the basic vehicle specifications, the vehicle energy consumption parameters and the landform and the traffics for the road link; and a route search means to search for a route using the predicted energy consumption for each calculated road link as a link cost.

In estimating the vehicle energy consumption parameter, the electric energy consumption or the fuel consumption for idling and the conversion efficiency from the combustion energy or electric energy consumed by the vehicle on the move into kinetic energy are determined.

Also, the fuel consumption rate for a prescribed emission test cycle such as 10.15 or JC08 mode or FTP or ECE employed in some countries is used as the fuel consumption rate in emission test cycle.

Further, in calculating the characteristics of energy consumption, the electric energy consumption or the fuel consumption for idling is estimated from the input displacement.

According to this invention, even the user having no special knowledge can acquire the characteristics of energy consumption of the engine or the motor, predict the energy consumption reflecting the traffics and the landform, search for a route minimizing the energy consumption based on the prediction value, and thus guide the vehicle along the route found by search thereby to reduce the energy consumption.

BRIEF DESCRIPTION OF THE DRAWINGS

FIG. 2 is a diagram for explaining the format of the running procedure stored in a running procedure DB 1100.

FIG. 3 is a diagram showing the data structure of a vehicle characteristic DB 1300.

FIG. 5 is a diagram showing the data structure of a road map 3400.

FIG. 7 shows an example of an input screen displaying the emission test cycle mode and the fuel consumption rate in the basic vehicle specification setting unit 3800.

FIG. 8 shows an example of the motive power supply type input screen in the basic vehicle specification setting unit 3800.

DETAILED DESCRIPTION OF THE INVENTION

A car navigation system according to an embodiment is explained in detail below with reference to the accompanying drawings.

First Embodiment

Figure 1:
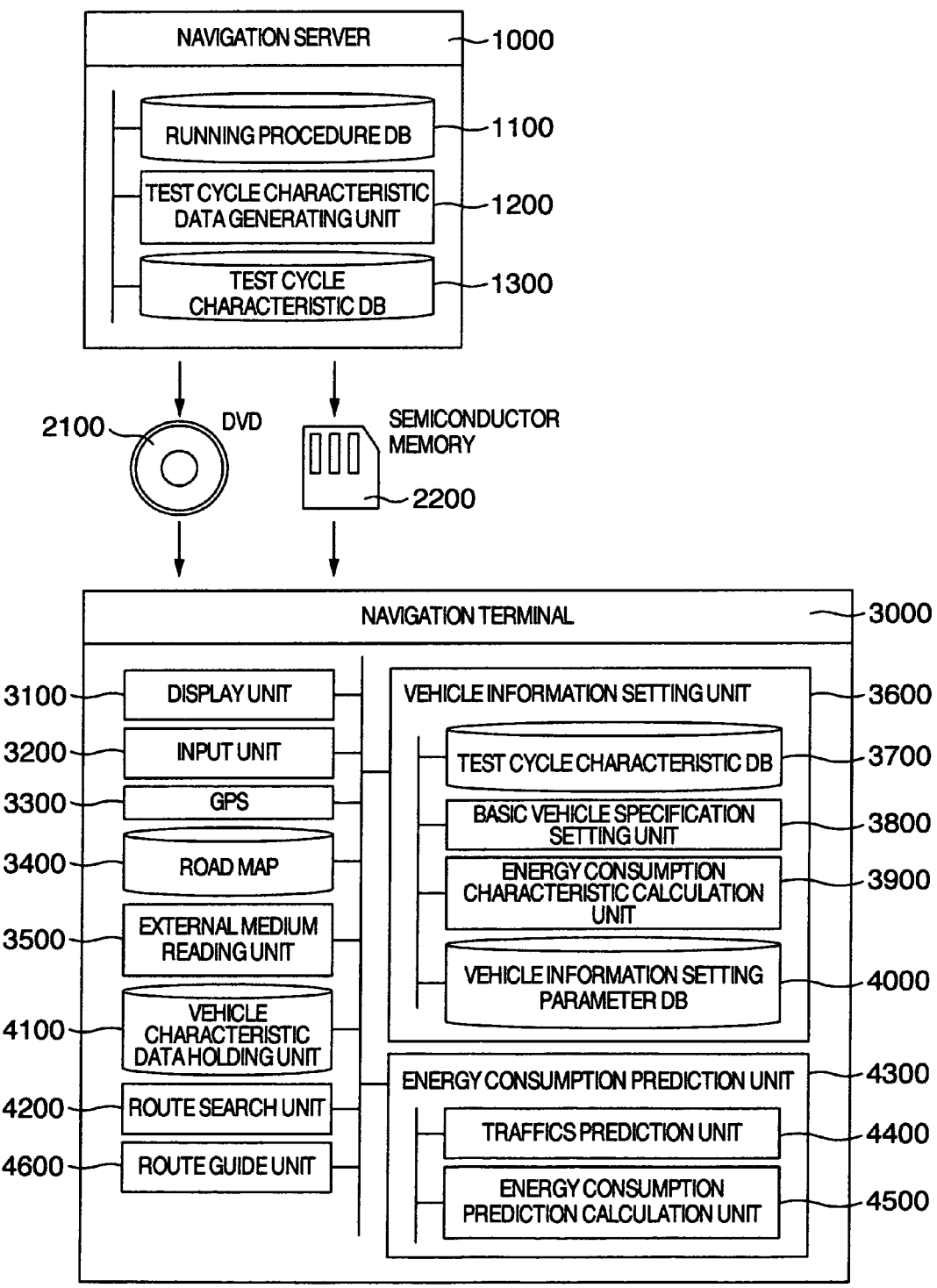
FIG. 1 is a diagram showing a configuration of a car navigation system according to this invention.

FIG. 1 is a diagram showing the configuration of a car navigation system according to the present invention. The car navigation system shown in FIG. 1 includes a navigation server 1000 and a navigation terminal 3000.

The navigation server 1000 includes a running procedure DB 1100, a test cycle characteristic value generating unit 1200 and a running characteristic DB 1300. The running procedure DB 1100 stores the running procedure for measuring the emission test cycle fuel consumption rate. FIG. 2 shows an example of the format of the running procedure stored in the running procedure DB 1100. As shown in FIG. 2, the running procedure is stored as the information on the relation, in each emission test cycle mode defined for each running step, between the running time, the running speed and the gradient of the running section. In the running step i of the emission test cycle involved as described below, the running time is designated as $T(i)$, the running speed as $V(i)$ and the gradient of the running section as $(\theta i)$.

In the test cycle characteristic value generating unit 1200, the required time TT [sec], the running distance L [m] and the driving characteristic value K [J/kg] indicating the energy consumption per unit mass of the vehicle on the move in accordance with the running procedure stored in the running procedure DB 1100 are calculated from the equation of motion of the vehicle and held in the running characteristic DB 1300. According to this invention, these three amounts are collectively referred to as the test cycle characteristic values. The data structure of the test cycle characteristic values in the test cycle characteristic value DB 1300 is shown in FIG. 3. As shown in FIG. 3, the test cycle characteristic values are held for each emission test cycle mode.

Figure 4:
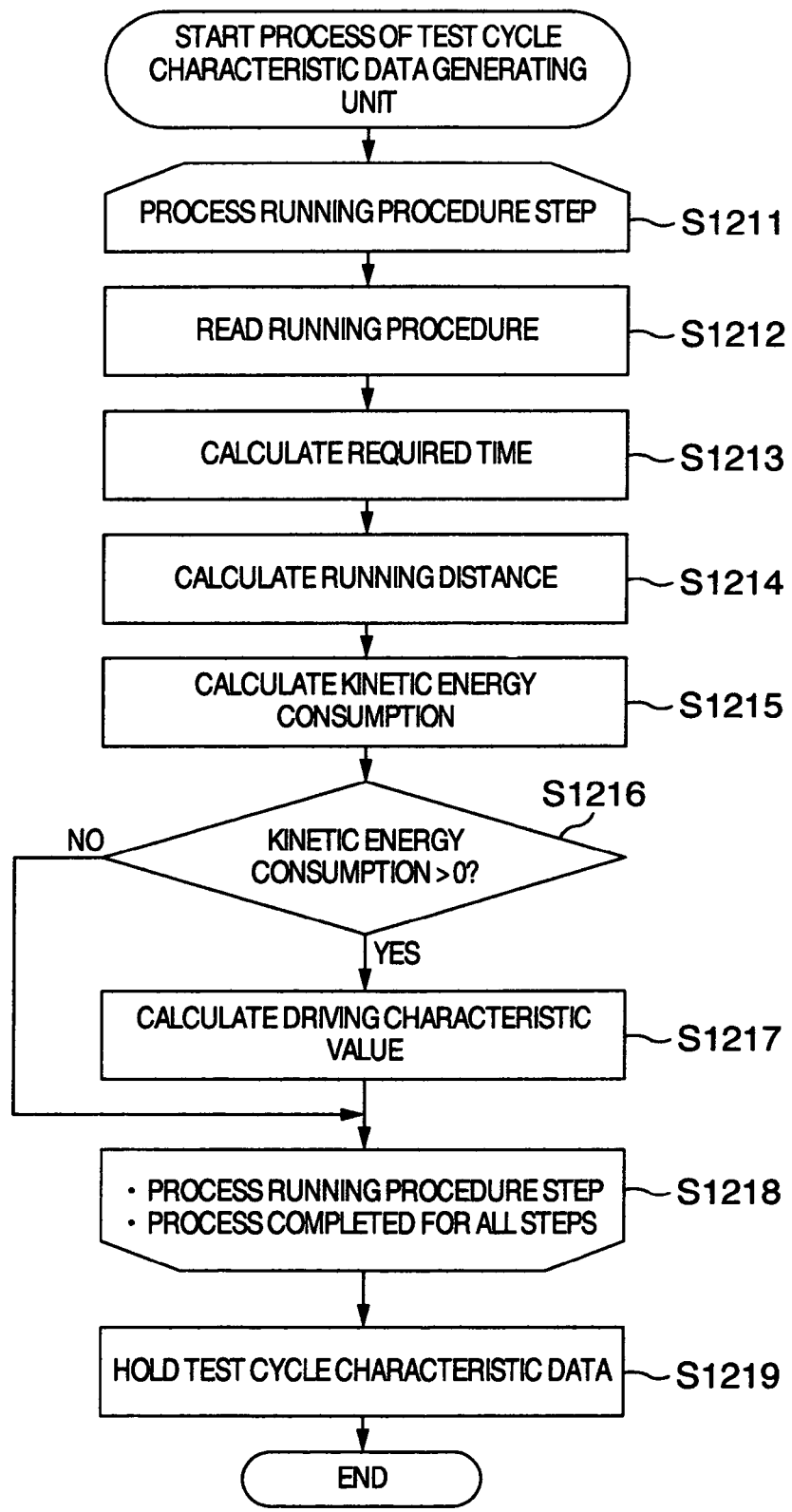
FIG. 4 is a flowchart showing the processes executed in a test cycle characteristic value generating unit 1200.

FIG. 4 is a flowchart showing the processes executed in the test cycle characteristic value generating unit 1200. Among these processes, the processes S1211 to S1218 are repeatedly executed in loop as many times as the number of steps included in the running procedure for the emission test cycle mode involved.

In the running procedure reading process S1212, the running procedures of the present step and the immediately preceding step are read from the running procedure DB 1100. Specifically, assuming that the present step is i, the running procedures for steps i and i−1 are read. In the case of step 1 (i=1), however, $T(0)$ is determined as equal to 0, $V(0)$ to $V(1)$ and $\theta(0)$ to $\theta(1)$.

In the required time calculation process S1213, the time $t(i)$ [sec] required per step in the ith step is calculated as $t(i)=T(i)-T(i-1)$ and added to the total required time as $TT=TT+t(i)$. Next, in the running distance calculation process S1214, the running distance $l(i)$ [m] for each ith step is calculated as $V(i) \times T(i)$ and added to the total running distance L as $L+l(i)$.

In the kinetic energy consumption calculation process S1215, on the other hand, the kinetic energy consumption $k(i)$ [J/kg] per unit mass for the ith step is calculated as $k(i)=(\mu+\sin\theta) \times g \times l(i)+(V(i)-V(i-1)) \times l(i)$. The friction coefficient $\mu$ [N/m], of which the difference between vehicle models is considered negligibly small, is shared by all the vehicle models. Assume, for example, that $\mu=0.02$ [N/m]. Also, the gravitational acceleration characteristic is assumed to be g [m/sec$^2$].

The process S1216 determines whether the kinetic energy consumption $k(i)$ per unit mass is larger than 0 or not. In the case where the kinetic energy consumption $k(i)$ per unit mass is positive, energy is consumed by the vehicle on the move, while in the case where $k(i)$ is negative, no energy is consumed by the vehicle. The driving characteristic value K is required to be calculated only in the case where the kinetic energy consumption $k(i)$ per unit mass is positive. In the case where $k(i)$ is larger than zero, the driving characteristic value calculation process S1217 is executed and $k(i)$ is added to the driving characteristic value K as $K+k(i)$. In the case where $k(i)$ is negative, on the other hand, the driving characteristic value calculation process S1217 is skipped.

Once the calculation of the increment of the driving characteristic value K in step i is completed in this way, S1218 determines whether the process for all the steps of the running procedure for the emission test cycle mode involved is completed or not, and if not yet completed, the step i is increased by one and the process is returned to the leading process S1211 of the loop.

Upon complete execution of the process for all the steps of the running procedure, the test cycle characteristic values (required time TT, running distance L, driving characteristic value K) generated in the loop of the processes S1211 to S1218 are stored in the running characteristic DB 1300 in the test cycle characteristic value holding process S1219 together with the emission test cycle mode of the running procedure used. The test cycle characteristic values generated by this procedure are independent of the vehicle model and determined only by the emission test cycle procedure.

The test cycle characteristic value for each emission test cycle mode in the running characteristic DB 1300 generated in the navigation server 1000 by the process described above is delivered to the navigation terminal 3000 through a medium such as a DVD 2100 or a nonvolatile semiconductor memory 2200 and held in the running characteristic DB 3700 in the navigation terminal 3000.

Next, the configuration of the navigation terminal 3000 is explained. The navigation terminal 3000 includes a display unit 3100, an input unit 3200, a GPS 3300, a road map 3400, an external medium reading unit 3500, a vehicle information setting unit 3600, a vehicle characteristic data holding unit 4100, a route search unit 4200, an energy consumption prediction unit 4300 and a route guide unit 4600. The display unit 3100 can display an arbitrary pattern or character in color using the LCD (liquid crystal display), etc. The input unit 3200 is a button or a touch panel integrated with the LCD of the display unit 3100 to accept various input operations of the user. The GPS (global positioning system) 3300 is a device to acquire the present coordinate of the vehicle.

The road map 3400 has stored therein the link information of various road links. Incidentally, the road link is defined as a structural unit of a road map and indicates a predetermined section on a road such as a section between adjacent intersections. In the description that follows, the term "link" should be understood to indicate a road link. FIG. 5 shows the data structure of the link information in the road map 3400. The link information contains the link number, the link length, the road class such as a toll road or an ordinary road, the link coordinates at the starting/ending points of a road link indicated by the latitude/longitude, the connected link no. indicating the connection by the link number of other road links connected to the starting/ending points of a given road link, and the height difference between the link starting and ending points indicating the average gradient in a particular link. In the link information, different link numbers are attached to up and down lanes even in the same road section of the same road, and the link starting/ending points are defined according to the direction in which the vehicles run.

The external medium reading unit 3500 reads such a medium as a nonvolatile semiconductor memory 2200. The test cycle characteristic values for each emission test cycle mode generated by the navigation server 1000 and stored in the running characteristic DB 1300 are read through the medium and held in the running characteristic DB 3700 of a vehicle information setting unit 3600 described later.

The vehicle information setting unit 3600 is configured of a running characteristic DB 3700, a basic vehicle specification setting unit 3800, an energy consumption characteristic calculation unit 3900 and a vehicle information setting parameter DB 4000. This running characteristic DB 3700, as described above, copies the test cycle characteristic values from the running characteristic DB 1300 of the navigation server 1000 and has the same data structure as the running characteristic DB 1300. The process is executed by the vehicle information setting unit 3600 in the case where no vehicle parameter is set in the navigation terminal 3000 as at the time of initial activation of the navigation terminal 3000 or in the case where the vehicle information is set in accordance with a command from the user. In this way, the process is started by the basic vehicle specification setting unit 3800 for the first time.

The basic vehicle specification setting unit 3800 accepts the input, from the user, of the vehicle weight W [kg], the emission test cycle mode, the emission test cycle fuel consumption rate R [km/L] (or R [km/Wh] for the electric vehicle), the type of motive power supply such as the high-octane gasoline engine, the regular gasoline engine, the diesel engine or the electric vehicle, and the displacement D [cc]. It should be noted that "L" shows "liter". The information of these items can be acquired from the vehicle inspection certificate, the catalog or the Web site even by the general user having no special knowledge about the automotive vehicle. According to this invention, the information input to the basic vehicle specification setting unit 3800 are referred to collectively as the basic vehicle specifications.

Figure 6:
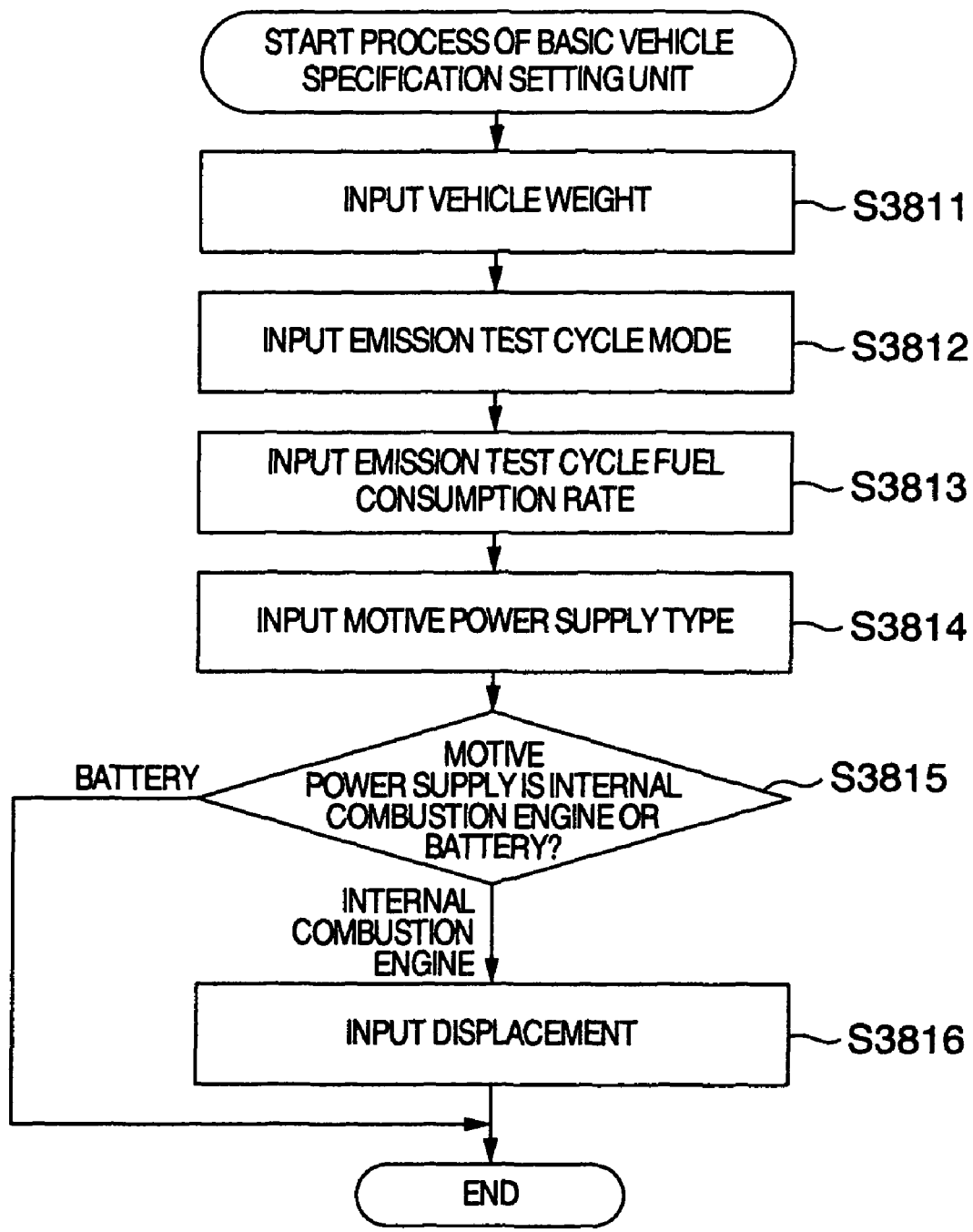
FIG. 6 is a flowchart for the processes executed in a basic vehicle specification setting unit 3800.

A flowchart of the process executed in the basic vehicle specification setting unit 3800 is shown in FIG. 6. In the vehicle weight input process S3811, the input of the vehicle weight from the user is accepted through the input unit 3200. In the emission test cycle mode input process S3812, a list of emission test cycle modes is generated first from the test cycle characteristic values held in the running characteristic DB 3700, and then presented to the user by being displayed on the display unit 3100. In this way, the selection of the emission test cycle mode of the test cycle characteristic values used for setting the vehicle information is accepted from the user through the input unit 3200. An example of the screen displaying the emission test cycle mode list is shown in section (a) of FIG. 7.

In the emission test cycle fuel consumption rate input process S3813, the fuel consumption rate for the emission test cycle mode selected by the user is accepted in the emission test cycle mode input process S3812 from the user through the input unit 3200. An example of screen display on the display unit 3100 for inputting the fuel consumption rate value is shown in section (b) of FIG. 7. In this screen display, an input error can be prevented by changing the color of any select button corresponding to a selected emission test cycle mode, by displaying the select button corresponding to an unselected emission test cycle mode in a light color or by otherwise displaying the selected emission test cycle mode in highlighted manner.

In the motive power supply type input process S3814, as shown in FIG. 8, the selection screen of the display unit 3100 displaying a list of types of vehicle motive power supplies is presented to the user, and the input of the motive power supply used by the vehicle involved is accepted.

In process S3815, assume that the motive power supply of the vehicle involved is an internal combustion engine such as the high-octane gasoline engine, the regular gasoline engine or the diesel engine based on the result of inputting the power supply type in the power supply type input process S3814. Then, the process proceeds to the displacement input process S3816. In the case of the electric vehicle, on the other hand, the value of the displacement D is not required to be set, and therefore, the displacement input process S3816 is skipped. In the displacement input process S3816, the numerical value of the displacement D of the vehicle involved is accepted from the user through the input unit 3200. In this way, the input of the basic vehicle specification is accepted from the user thereby to end the process in the basic vehicle specification setting unit 3800.

After the process execution in the basic vehicle specification setting unit 3800, the process by the energy consumption characteristic calculation unit 3900 is executed. In the energy consumption characteristic calculation unit 3900, the vehicle energy consumption parameter for the vehicle involved is determined based on the basic vehicle specifications set by the basic vehicle specification setting unit 3800 and the test cycle characteristic values of the running characteristic DB 3700. Incidentally, the vehicle energy consumption parameter is defined as an amount determined according to the vehicle characteristic and indicates the energy consumption characteristic of the engine or the motor providing the motive power supply of the vehicle. In the case under consideration, the two amounts including the basic consumption coefficient f and the energy conversion efficiency E shown below are collectively called the vehicle energy consumption parameter. The vehicle energy consumption Q [J], the running time S [sec], and the kinetic energy consumption K' [J] of the vehicle hold the relation described below.

$$Q = F \times S + 1/E \times K' \qquad (1)$$

where the basic consumption coefficient F is the amount of energy consumed per unit time against the internal resistance of the engine or the drive system, and corresponds to the amount of energy consumed in idling state. This amount is expressed in J/sec. Also, the energy conversion efficiency E indicates the efficiency of conversion from electric energy or fuel combustion energy to kinetic energy.

Figures 9, 10:
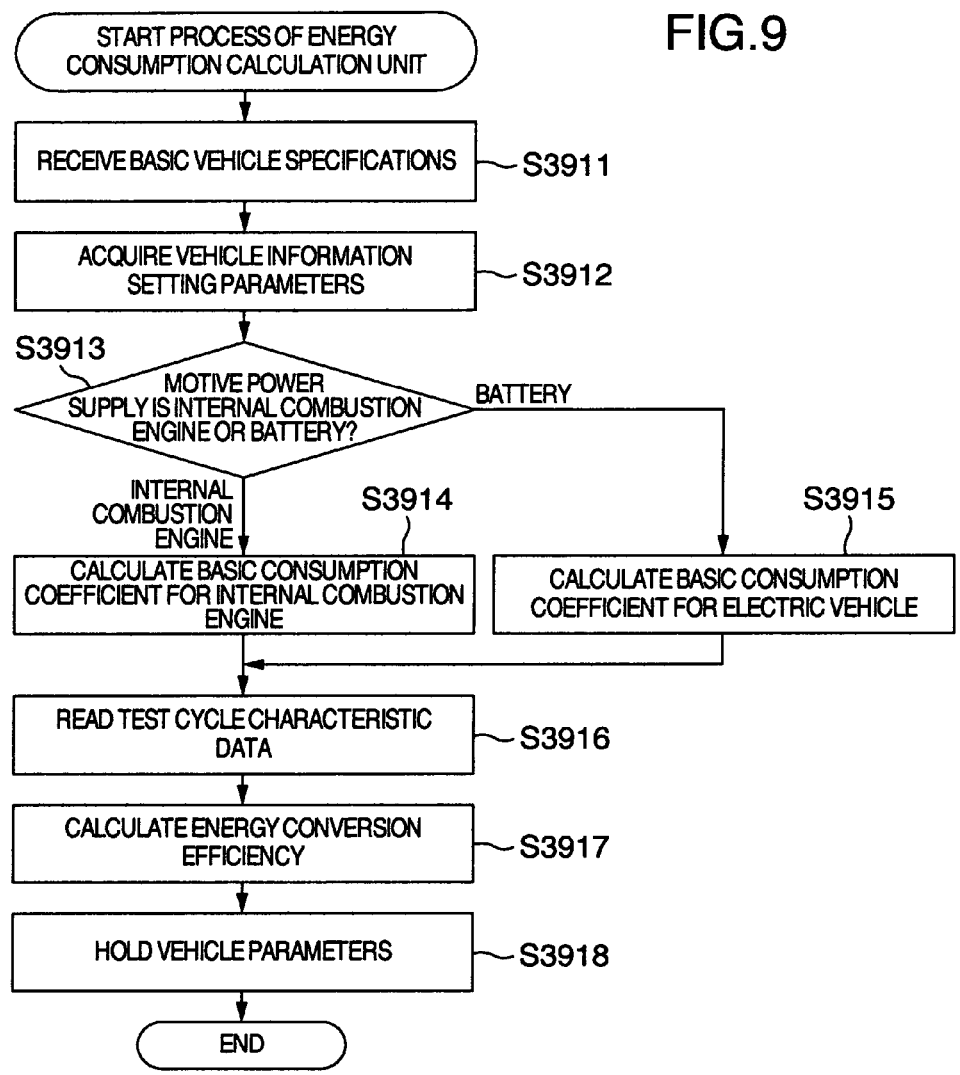
FIG. 9 is a flowchart showing the processes executed in an energy consumption characteristic calculation unit 3900.
FIG. 10 is a diagram showing the data structure for a vehicle information setting parameter DB 4000.

A flowchart for the process of calculating the vehicle energy consumption parameter in the energy consumption characteristic calculation unit 3900 is shown in FIG. 9. In the basic vehicle specification receiving process S3911, the basic vehicle specifications input by the user in the preceding process are received from the basic vehicle specification setting unit 3800. In the vehicle information setting parameter acquisition process S3912, the vehicle information setting parameter based on the motive power supply type in the received basic vehicle specifications is acquired, for use in the subsequent processes, from the vehicle information setting parameter DB 4000. The vehicle information setting parameter DB 4000 includes different data for different motive power supply types as shown in FIG. 10. Among the data included in the vehicle information setting parameter, the meaning of the relation a between the displacement and the basic consumption coefficient is described later. Also, the energy equivalent H is a coefficient used to convert the unit of the fuel consumption rate R from km/L or km/Wh normally used into the unit of km/J by the operation of the fuel consumption rate R×H, and indicates the amount of energy generated per unit amount of fuel or electric power.

The process S3913 branches according to the motive power supply type in the basic vehicle specifications. In the case of a vehicle having the internal combustion engine such as the high-octane gasoline engine, the regular gasoline engine or the diesel engine, the process proceeds to the internal combustion engine basic consumption coefficient calculation process S3914, while in the case of the electric vehicle, the process proceeds to the electric vehicle basic consumption coefficient calculation process S3915.

In the internal combustion engine basic consumption coefficient calculation process S3914, the basic consumption coefficient F for the vehicle having the internal combustion engine is determined. The basic consumption coefficient F is the energy consumption in idling state and considered to be substantially proportional to the displacement. In the case where the proportional relation between the displacement and the basic consumption coefficient is determined in advance and expressed as the relation α providing a proportionality constant between the displacement and the basic consumption coefficient, therefore, the basic consumption coefficient F can be determined as F=αD using the displacement D in the basic vehicle specifications.

The proportionality constant α may be determined as α=F'/D', for example, by measuring the displacement D' and the energy consumption F' in idling state of a representative vehicle model for each motive power supply type among the vehicles having the navigation system. As a result, by the measurement only for one vehicle model for each power supply type, the basic consumption coefficients for vehicle models of various displacements can be determined. According to this method, the proportionality constant α is generated in advance and held in the vehicle information setting parameter DB 4000.

In the electric vehicle basic consumption coefficient calculation process S3915, the basic consumption coefficient for the electric vehicle is determined. In the electric vehicle, no energy is consumed by idling, and therefore, the method having the relation F=0 may be employed.

Also, in the case where the energy consumption of the electric equipment and the air conditioner is considered great not ignorable for the vehicle having the internal combustion engine or the electric vehicle, the energy consumption can be predicted more accurately by adding the temporal average value of energy consumption by the electric equipment and the air-conditioner to the basic consumption coefficient.

In the test cycle characteristic value reading process S3916, the test cycle characteristic values for the emission test cycle mode contained in the basic vehicle specifications is acquired from the running characteristic DB 3700.

In the energy conversion efficiency calculation process S3917, the energy conversion efficiency E is calculated. In the emission test cycle indicated by the emission test cycle mode set in the basic vehicle specifications received in the basic vehicle specification receiving process S3911, the energy consumption Q can be determined as Q=L/(R×H), where R is the emission test cycle fuel consumption rate in the basic vehicle specifications and L the running distance of the test cycle characteristic values, based on the test cycle characteristic values acquired in the test cycle characteristic value reading process S3916. Also, with regard to the energy consumption Q, Equation (1) holds. As to the first term F×S on the right side of Equation (1), F is determined in the internal combustion engine basic consumption coefficient calculation process S3914 or the electric vehicle basic consumption coefficient calculation process S3915, and the travel time S can be determined as S=TT from the required time TT of the test cycle characteristic values. Also, the kinetic energy consumption K' can be determined as K'=W×K using the vehicle weight W in the basic vehicle specifications in view of the fact that the driving characteristic value K of the test cycle characteristic value is the total kinetic energy per unit mass for the emission test cycle mode.

As described above, all the quantities other than E in Equation (1) can be determined, and therefore, by solving Equation (1), the energy conversion efficiency E can be determined from Equation (2) as described below.

$$E = W \times K / (L/(R+H) - F \times TT) \qquad (2)$$

Figures 11, 12:
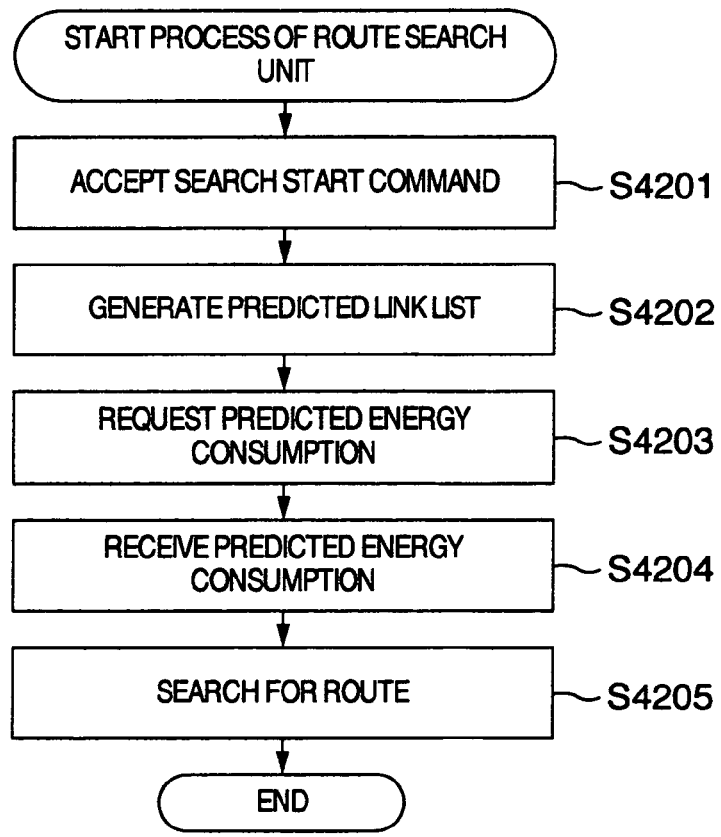
FIG. 11 is a diagram showing the data structure for a vehicle characteristic data holding unit 4100.
FIG. 12 is a flowchart showing the process executed in a route search unit 4200.

In the vehicle characteristic data holding process S3918, the energy consumption parameter including the basic consumption coefficient F determined in the internal combustion engine basic consumption coefficient calculation process S3914 or the electric vehicle basic consumption coefficient calculation process S3915 and the energy conversion efficiency E determined in the energy conversion efficiency calculation process S3917 on the one hand and the basic vehicle specifications received in the basic vehicle specification receiving process S3911 on the other hand, are held as the vehicle characteristic data in the vehicle characteristic data holding unit 4100. An example of the data format in the vehicle characteristic data holding unit 4100 is shown in FIG. 11.

Next, the process executed in the route search unit 4200 is explained. A flowchart of the process executed in the route search unit 4200 is shown in FIG. 12. In the route search unit 4200, the search start command receiving process S4201 accepts, through the input unit 3200, the input of a starting point, a destination and the starting time and a command from the user to carry out the route search. The position of the user's vehicle acquired in the GPS 3300 may be input as the starting point (place). Also, the present time acquired from a timer not shown as well as the input from the user may be used as the starting time.

Next, a predicted link list which is an extraction of road links for prediction of the energy consumption is generated in a predicted link list generating process S4202. As a predicted link, the links highly liable to be included in the route between the starting point and the destination are extracted. As one method, for example, all the links with the starting or ending point thereof located within a predetermined distance from the straight line connecting the starting point and the destination may be extracted from the road map 3400.

Next, in the predicted energy consumption request process S4203, the predicted link list and the starting time are delivered to the energy consumption prediction unit 4300 thereby to predict the energy consumption in the links included in the predicted link list. The process executed in the energy consumption prediction unit 4300 is explained later.

In the predicted energy consumption receiving process S4204, the predicted energy consumption of the links contained in the predicted link list and calculated in the energy consumption prediction unit 4300 is received.

In the route search process S4205, a route minimizing the energy consumption between the starting point and the destination is solved using the cost minimizing route search algorithm such as Dijkstra's algorithm together with the inter-link connection information indicated as the connected link no. in the road map 3400 with the received predicted energy consumption as a link cost. The route thus found which minimizes the energy consumption is delivered to the route guide unit 4600.

The process of predicting the energy consumption according to this invention is explained. According to this invention, the energy consumption prediction unit 4300 predicts the energy consumption in the unit of links taking the landform, the traffics and the vehicle parameters into consideration. The energy consumption prediction unit 4300 is configured of a traffics prediction unit 4400 and an energy consumption prediction calculation unit 4500.

In the traffics prediction unit 4400, the link travel time collected for each link in the past is classified by day type and time zone and totalized, and from the statistical traffics thus generated, the travel time in the time zone corresponding to an estimated passage time is acquired for each of the links for which the energy consumption is predicted. This travel time is delivered to the energy consumption prediction calculation unit 4500 as a predicted link travel time $T_{PRED}$ for each link. Incidentally, the estimated passage time for a given link may be determined, for example, by calculating the straight distance from the present vehicle position to the starting or ending point of a link for which the energy consumption is predicted, using the present vehicle position and the present time at which the route search is executed. Then, the time obtained by dividing the straight distance by the average vehicle speed in a region/map mesh including the predicted link calculated from the statistical traffics in advance is added to the present time.

In the energy consumption prediction calculation unit 4500, the energy consumption is predicted for a particular link included in the prediction link list delivered from the route search unit 4200 based on the predicted link travel time included in the traffics prediction unit 4400 and the vehicle characteristic data included in the vehicle information setting unit 3600.

Figure 13:
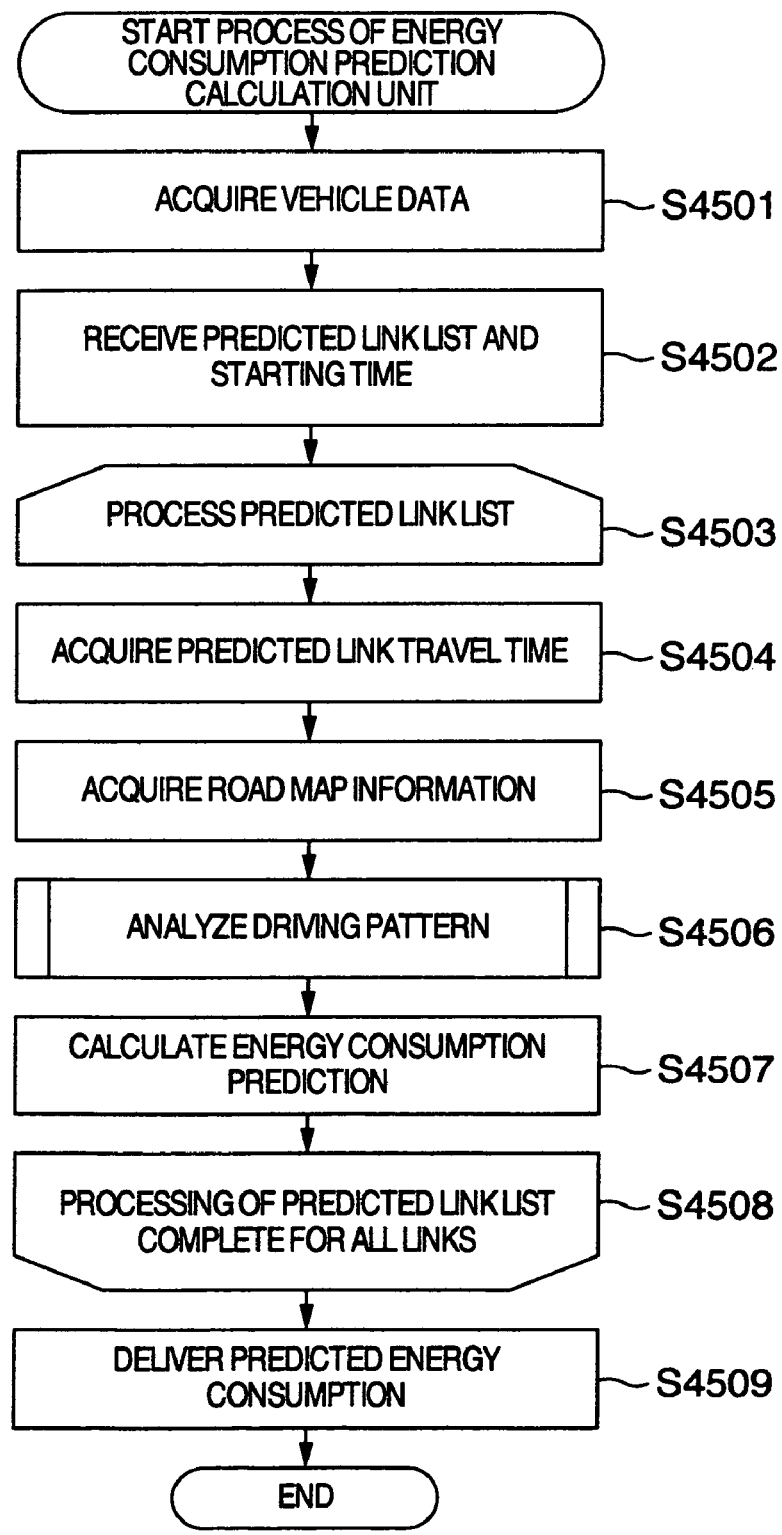
FIG. 13 is a flowchart showing the processes executed in an energy consumption prediction calculation unit 4500.

FIG. 13 is a flowchart for the process executed in the energy consumption prediction calculation unit 4500. First, the vehicle characteristic data acquisition process S4501 acquires the vehicle characteristic data for the vehicle for which the energy consumption is predicted and which is determined in the vehicle information setting unit 3600 and stored in the vehicle characteristic data holding unit 4100.

The prediction link list/starting time receiving process S4502 receives, from the route search unit 4200, the prediction link list including the links for which the energy consumption is predicted and the starting time providing a reference to calculate the estimated passage time zone for each link for which the energy consumption is predicted.

In the energy consumption prediction calculation unit 4500, the loop of the prediction link list processes of S4503 to S4508 is repeated so that the energy consumption is predicted for all the links in the prediction link list.

First, in the prediction link travel time acquisition process S4504, the predicted link travel time $T_{PRED}$ determined as described above for the link to be processed is received from the traffics prediction unit 4400. In the road map information acquisition process S4505, the link number of the link to be processed is set in correspondence with the link number included in the road map 3400, and the link information of the link to be processed is read from the road map 3400.

Figure 14:
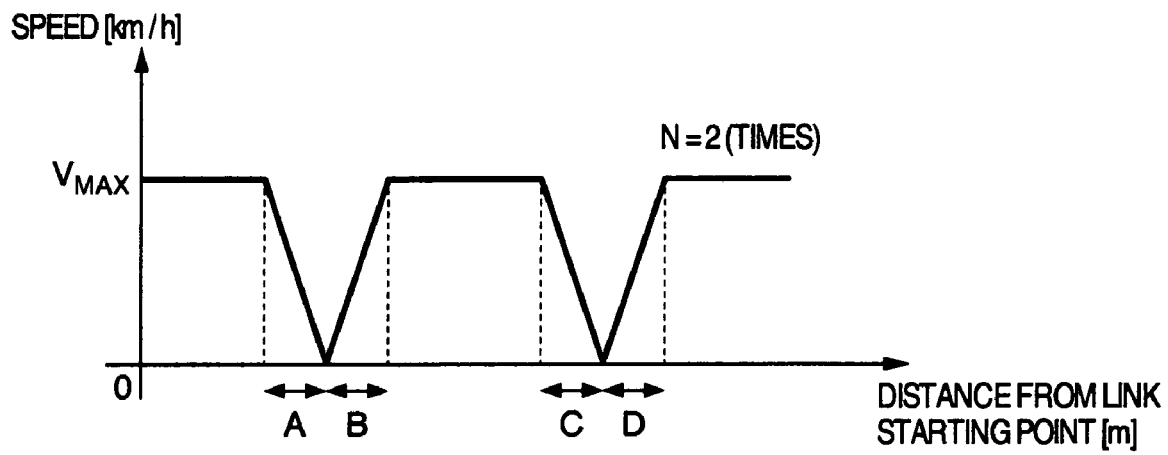
FIG. 14 is a schematic diagram showing a driving pattern in a driving pattern analysis process S4507.

In the driving pattern analysis process S4506, the driving pattern such as the running speed and the acceleration/deceleration in the link to be processed are analyzed from the prediction link travel time $T_{PRED}$. According to this invention, this driving pattern is determined from the prediction link travel time $T_{PRED}$. As shown in the schematic diagram of FIG. 14 for the driving pattern prediction according to the invention, the driving pattern is expressed as a combination of a predetermined maximum speed $V_{MAX}$ at which the vehicle runs and the number N of times the acceleration/deceleration occurs between the maximum speed $V_{MAX}$ and the hourly speed of 0 km/h (i.e. stationary state) in a particular link.

Figure 15:
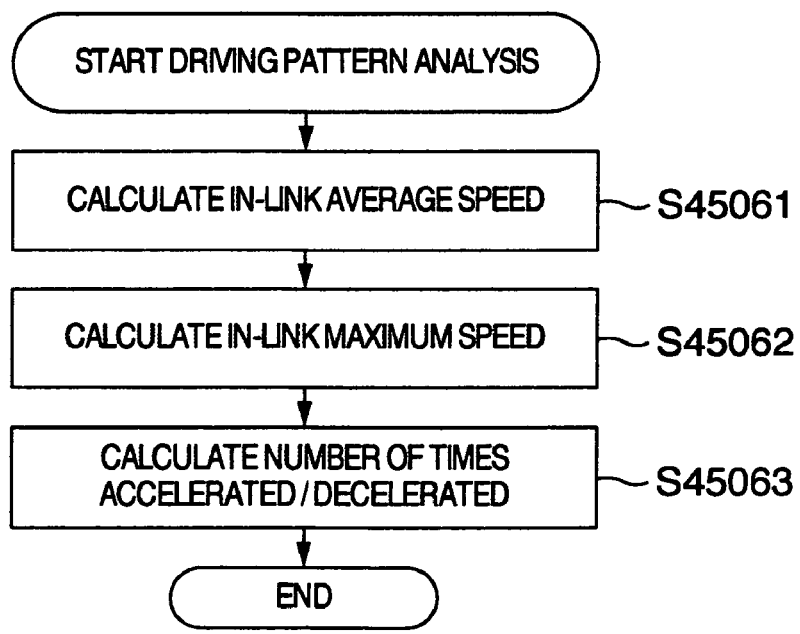
FIG. 15 is a flowchart showing the processes executed in the driving pattern analysis process S4507.

FIG. 15 shows the detailed process executed in the driving pattern analysis process S4506. In the in-link average speed calculation process S45061, the average speed $V_{AVE}$ in the link is calculated. Specifically, $V_{AVE}$ is calculated as $L/T_{PRED}$, where L is the link length and $T_{PRED}$ the predicted link travel time.

In the in-link maximum speed calculation process S45062, a predetermined speed $V_{ADD}$ is added to $V_{AVE}$ to determine the maximum speed $V_{MAX}$ in the link. The value $V_{ADD}$ to be added may be determined, for example, according to the road class in the link information acquired from the road map 3400. For example, $V_{ADD}$ is determined as 10 km/h for an ordinary road, and as 20 km/h for a toll road.

In the acceleration/deceleration number calculation process S45063, the number N of times the acceleration or deceleration occurs between the maximum speed $V_{MAX}$ and the hourly speed of 0 km/h is predicted based on the predicted link travel time $T_{PRED}$ and the road class. While the vehicle is on the move, the acceleration or deceleration is made due to the signal or the speed fluctuation, and therefore, the acceleration/deceleration time can be approximated. By setting a typical acceleration/deceleration time at Tc, therefore, the relation $N=T_{PREd}/Tc$ can be obtained to determine N. On an ordinary road, the acceleration/deceleration time may be short due to the effect of signals, etc., while the speed change may be smaller and the acceleration/deceleration time longer on a toll road. For example, Tc may be set to 60 [sec] on an ordinary road, and 120 [sec] on a toll road. In this way, the maximum speed $V_{MAX}$ and the number N of times the acceleration/deceleration occurs are determined as an indication of the driving pattern of a link involved.

Next, in the energy consumption prediction calculation process S4507, the energy consumption Q is predicted using Equation (1) based on a vehicle energy consumption model. In this process, the basic consumption coefficient F used in Equation (1) is calculated in the vehicle information setting unit 3600 for the energy consumption parameter of the vehicle characteristic data and stored in the vehicle characteristic data holding unit 4100. The running time S used in Equation (1), on the other hand, is the predicted link travel time $T_{PRED}$. Also, the link length determined from the link information acquired for the link involved from the road map 3400 is designated as L, the average link gradient as θ, the friction coefficient as α and the gravitational acceleration as g of the same value as those used in the process of the test cycle characteristic value generating unit 1200. Based on the vehicle weight W set in the vehicle characteristic data and taking the effect of the friction, the gradient and the acceleration in the driving pattern into consideration, the kinetic energy consumption K' [J] of the vehicle is calculated as $$K'=W \times \text{MAX}(0,((\mu+\sin\theta) \times g \times L+N \times V_{MAX}^2/2)) \quad (3)$$

Incidentally, the function MAX returns the maximum argument value, and the calculation is carried out not to make K' a negative value as in the case where only the positive value of the kinetic energy consumption is totaled at the time of calculating the driving characteristic value K in the test cycle characteristic value generating unit 1200. From the height difference h between the starting and ending points and the link length L, the relation holds that sin θ=h/L. Therefore, according to the energy consumption model of Equation (1), the energy consumption Q in the link involved is predicted as $$Q=F \times T_{PRED}+1/E \times W \times \text{MAX}(0,(\mu \times g \times L+g \times h+N \times V_{MAX}^2/2)) \quad (4)$$

The prediction link list process of S4503 to S4508 is repeated and in the case where the process for all the links in the prediction link list is completed in the process S4508, then this loop process is ended. In the case where the process for all the links is not yet completed, on the other hand, one of the unprocessed links is selected, from the prediction link list and subjected again to the process for the prediction link list. After this loop process is completed, the predicted energy consumption calculated for all the links in the prediction link list is delivered to the route search unit 4200 by the predicted energy consumption delivery process S4509.

Next, the process executed by the route guide unit 4600 is explained. In the route guide unit 4600, the route information acquired from the route search unit 4200 is displayed on the display unit 3100 together with the present vehicle position acquired from the road map 3400 or the GPS 3300. As a result, the driver can drive along the route minimizing the energy consumption by following the guide of the navigation terminal 3000.

The configuration described above realizes a car navigation system in which even the user having no special knowledge can reduce the energy consumption by setting the energy consumption parameter of his/her vehicle and running along the route found as the result of search for the route minimizing the energy consumption based on the energy consumption prediction reflecting the traffics and the landform.

Second Embodiment

Figure 16:
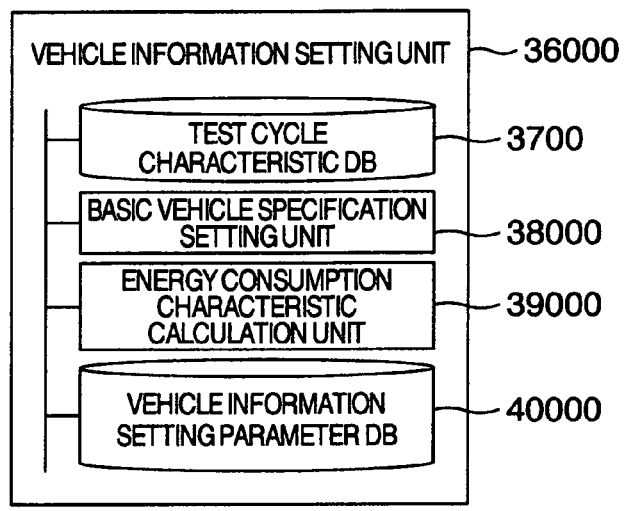
FIG. 16 is a diagram showing the configuration of a vehicle information setting unit 36000.

Next, a modification of the first embodiment is explained as a second embodiment. The car navigation system according to the second embodiment is different from the system according to the first embodiment only in the vehicle information setting unit of the navigation terminal 3000. FIG. 16 shows the configuration of the vehicle information setting unit 36000 according to the second embodiment.

The vehicle information setting unit 36000 according to the second embodiment has substantially the same configuration as the vehicle information setting unit 36000 according to the first embodiment, and includes a test cycle characteristic DB 3700, a basic vehicle specification setting unit 38000, an energy consumption characteristic calculation unit 39000 and a vehicle information setting parameter DB 40000.

As compared with the vehicle information setting parameter DB 4000 according to the first embodiment, the vehicle information setting parameter DB 40000 stores therein only the information on the energy equivalent H among the information stored in the vehicle information setting parameter DB 4000 according to the first embodiment.

Figure 17:
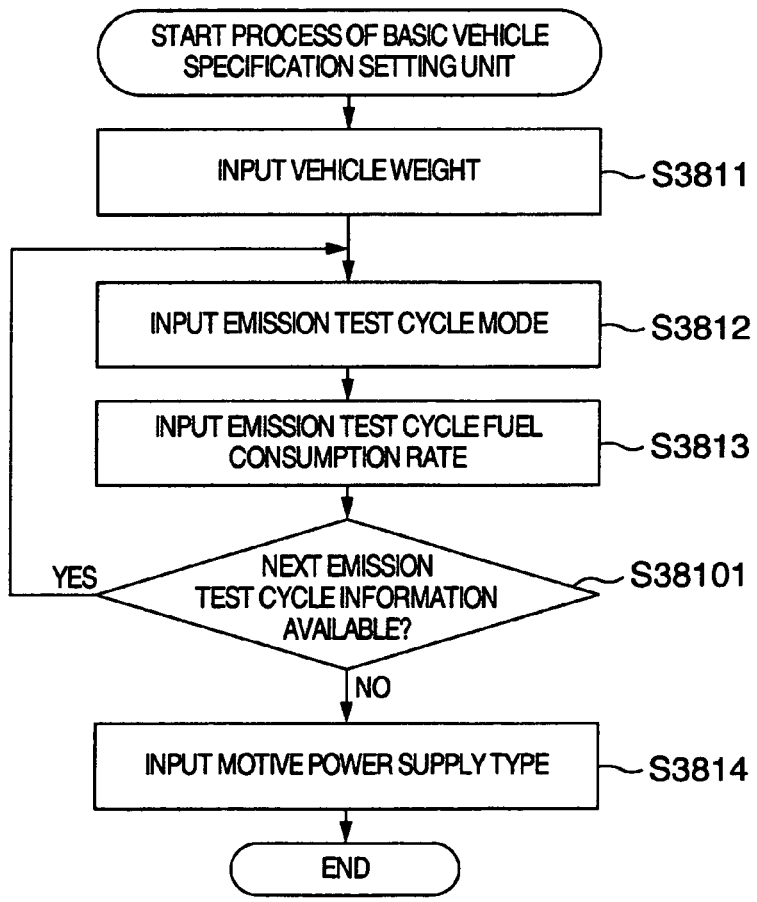
FIG. 17 is a flowchart showing the processes executed in a basic vehicle specification setting unit 38000.

Also, the basic vehicle specification setting unit 38000, like the basic vehicle specification setting unit 3800 according to the first embodiment, accepts the user input of the basic vehicle specifications such as the vehicle weight W [kg], at least two emission test cycle modes, the emission test cycle fuel consumption rate R [km/L] (or [km/Wh]) corresponding to each emission test cycle mode and the motive power supply type. However, the displacement is not necessary. FIG. 17 shows a flowchart of the process executed in the basic vehicle specification setting unit 38000. The process shown in this flowchart is similar to the corresponding process in the basic vehicle specification setting unit 3800 according to the first embodiment shown in FIG. 6, and the vehicle weight input process S3812 accepts the input of the vehicle weight from the user. In the emission test cycle mode input process S3812, the selection by the user from the emission test cycle mode list is accepted. Also, in the emission test cycle fuel consumption rate input process S3813, the value of the fuel consumption rate corresponding to the emission test cycle mode is accepted from the user.

In the process S38101, an inquiry is made to the user as to whether another information on the emission test cycle mode and the emission test cycle fuel consumption rate is available or not, and in the presence of such information, the process returns to S3812 to accept the input of the another emission test cycle mode. In the absence of another information, on the other hand, the process proceeds to the motive power supply type input process S3814 to accept the input of the motive power supply type from the user. Unlike in the process executed by the basic vehicle specification setting unit 3800 according to the first embodiment, the input of the basic vehicle specification by the user is ended without inputting the displacement. After ending the process in the basic vehicle specification setting unit 38000, the process is executed by the energy consumption characteristic calculation unit 39000.

In the energy consumption characteristic calculation unit 39000, the energy consumption parameter for the vehicle is determined based on the basic vehicle specifications set in the basic vehicle specification setting unit 38000 and the information of the test cycle characteristic DB 37000. The same type of the energy consumption parameter is set as in the first embodiment.

Figure 18:
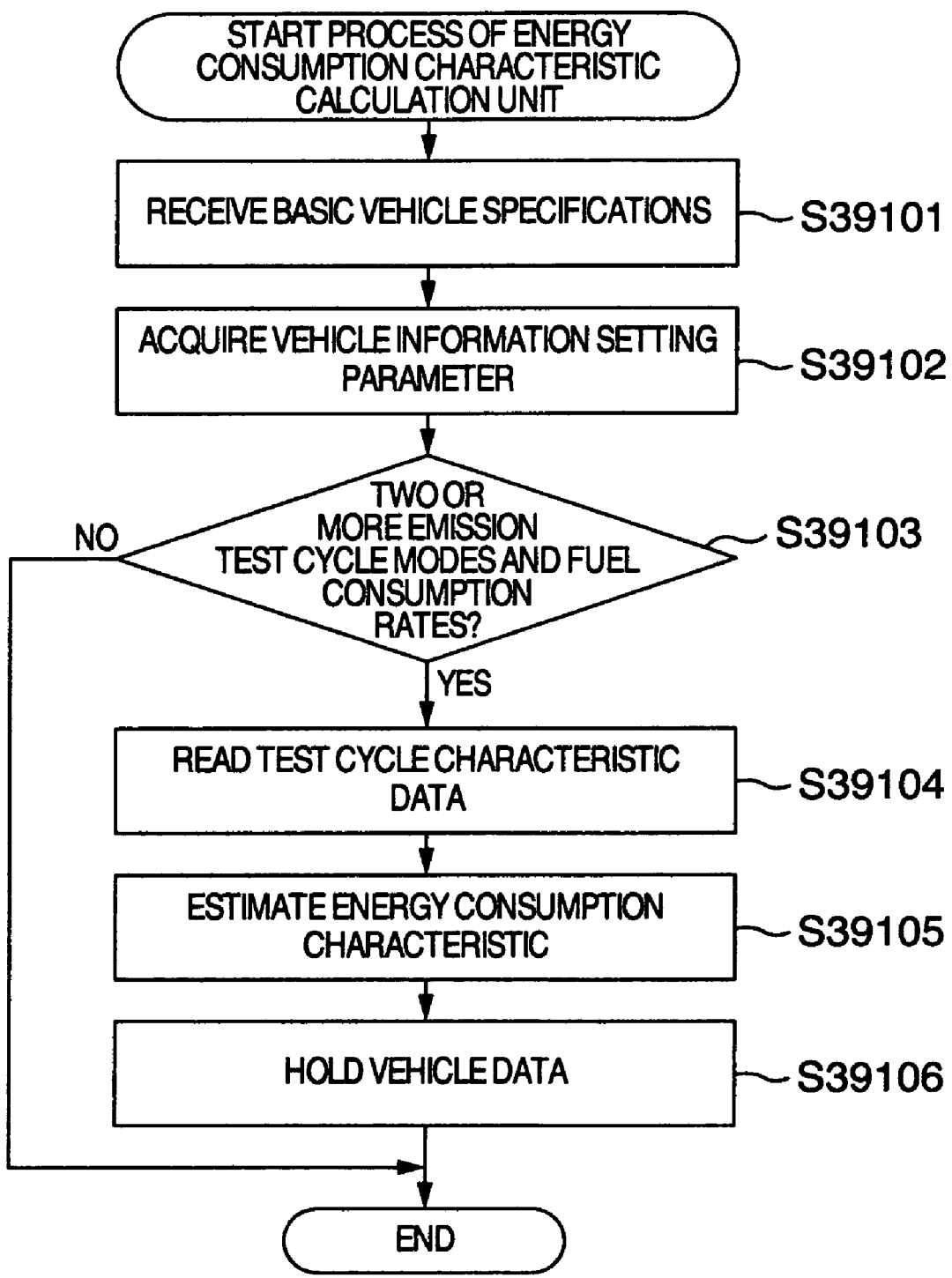
FIG. 18 is a flowchart showing the processes executed in an energy consumption characteristic calculation unit 39000.

The process executed by the energy consumption characteristic calculation unit 39000 according to the second embodiment is explained below with reference to FIG. 18. The basic vehicle specification receiving process S39101 receives the basic vehicle specifications input by the user from the basic vehicle specification setting unit 38000. In the vehicle information setting parameter acquisition process S3912, the data on the energy equivalent H corresponding to the motive power supply type is read from the vehicle information setting parameter DB 40000.

The process S39103 determines whether the basic vehicle specifications input by the user contains at least two emission test cycle modes and the fuel consumption rate data thereof, and in the case where the fuel consumption rate data corresponding to two or more emission test cycle modes are so contained, the process proceeds to the test cycle characteristic data reading process S39104, while in the case where only one emission test cycle mode is contained, on the other hand, the process is ended without setting the vehicle information. The description that follows assumes that M emission test cycle modes are input with M corresponding fuel consumption rate data.

In the test cycle characteristic data reading process S39104, the test cycle characteristic data is acquired from the test cycle characteristic DB 3700 for all the emission test cycle modes included in the basic vehicle specifications.

In the energy consumption characteristic estimation process S39105, the energy conversion efficiency E and the basic consumption coefficient F providing the energy consumption parameter are estimated. With regard to the fuel consumption rate corresponding to a plurality of emission test cycle characteristics received as the basic vehicle specifications in the basic vehicle specification receiving process S39101 and the test cycle characteristic data of each emission test cycle characteristic acquired in the test cycle characteristic data reading process S39104, assume that i is a suffix for discriminating the plurality of the emission test cycle modes. Then, like in the energy conversion efficiency calculation process S3917 according to the first embodiment, the equation for energy consumption corresponding to Equation (1) can be obtained as shown below by determining the energy consumption as $Q=L_i/(R_i \times H)$, the travel time as $S=TT_i$ and the kinetic energy consumption as $K'=W$ (vehicle weight)$\times K_i$ based on the running distance $L_i$, the required time $TT_i$ and the driving characteristic value $K_i$ for the ith emission test cycle mode.

$$L_i/(R_i \times H) = F \times TT_i + 1/E \times W \times K_i \quad (5)$$

Thus, M equations can be obtained for the emission test cycle mode.

By solving these M equations as simultaneous equations for the basic consumption coefficient F and the energy conversion efficiency E, the intended energy consumption parameter can be obtained. In the case where M is larger than 3, however, no solution may be determined. In the case above, with the square sum of the error, i.e. $e=\Sigma(L_i/(R_i \times H) - F \times TT_i + 1/E \times W \times K_i)^2$ as an evaluation function, the basic consumption coefficient F and the energy conversion efficiency E minimizing the value e is determined as an estimated value of the energy consumption parameter.

In the vehicle characteristic data holding process S39106, like in the vehicle characteristic data holding process S3918 of the first embodiment, the basic vehicle specifications received and the estimated value of the energy consumption parameter calculated are held in the vehicle characteristic data holding unit 4100.

In accordance with the procedure described above, the energy consumption parameter of the second embodiment is calculated. According to the second embodiment, as compared with the first embodiment, the energy consumption characteristic can be set even in the case where the displacement is unknown. Also, the energy consumption F' for idling is not required to be measured in advance for a representative vehicle model to estimate the basic consumption coefficient F.

Third Embodiment

Figure 19:
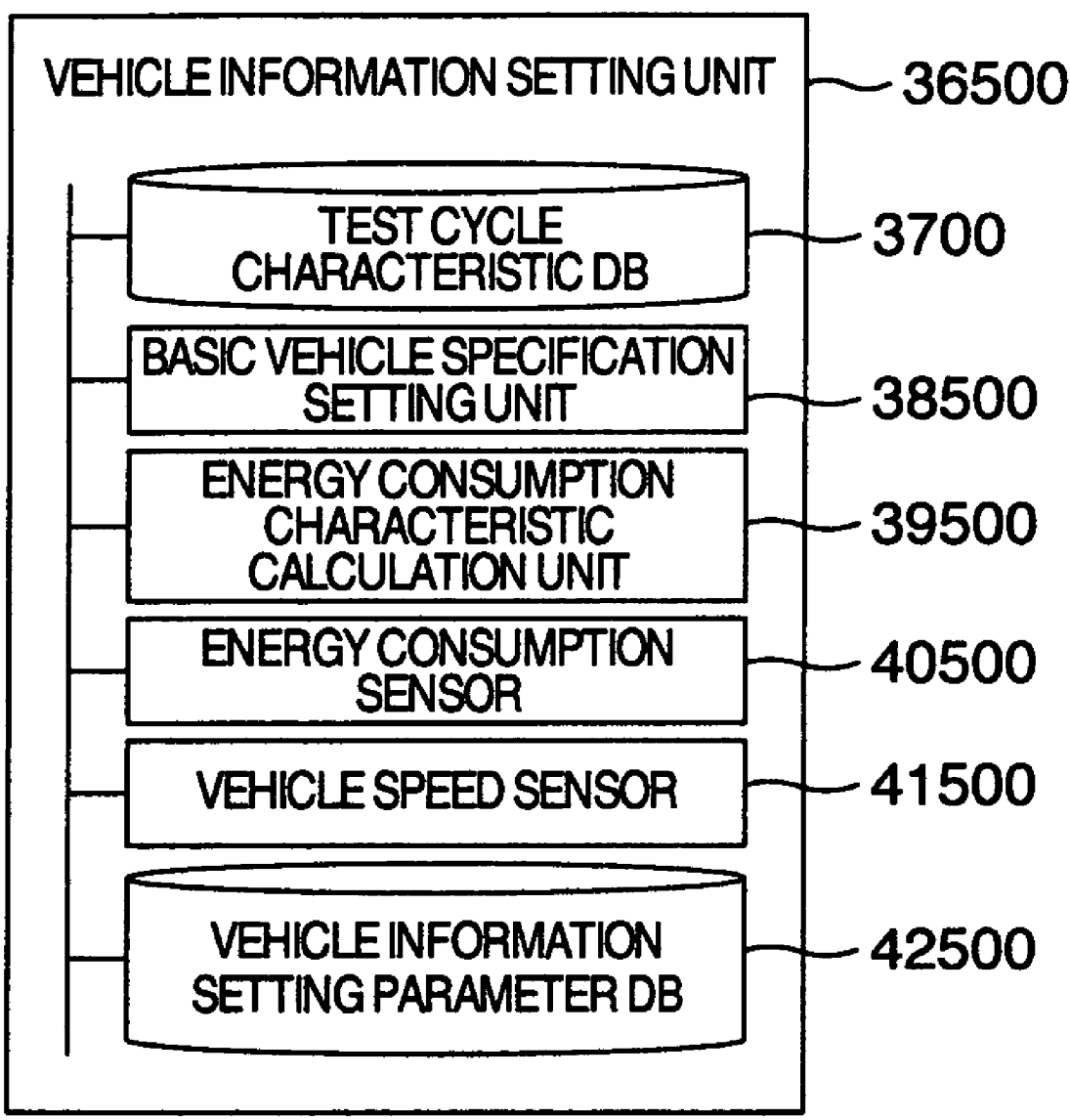
FIG. 19 is a diagram showing the configuration of a vehicle information setting unit 36500.

Now, another modification of the first embodiment is explained as a third embodiment. The car navigation system according to the third embodiment is different from the car navigation system according to the first embodiment only in the vehicle information setting unit of the navigation terminal 3000. FIG. 19 shows the configuration of the vehicle information setting unit 36500 according to the third embodiment. The vehicle information setting unit 36500 according to the third embodiment includes a test cycle characteristic DB 3700, a basic vehicle specification setting unit 38500, an energy consumption characteristic calculation unit 39500, an energy consumption sensor 40500, a vehicle speed sensor 41500 and a vehicle information setting parameter DB 42500.

The energy consumption sensor 40500 is for measuring the energy consumption of the vehicle, and provided by a measurement means such as a wattmeter in the case where the motive power supply type is the electric vehicle. In the case where a vehicle has an internal combustion engine as a motive power supply such as the high-octane gasoline engine, the regular gasoline engine or the diesel engine, on the other hand, the energy consumption sensor 40500 is a fuel flowmeter or an injector capable of acquiring the information on the fuel supply. In this case, the fuel injection amount determined based on such information as the injector valve opening time or the fuel supply amount determined by the fuel flowmeter is used as the amount of the fuel consumed, and a value converted to the energy consumption in accordance with the type of the fuel used is output.

The vehicle speed sensor 41500 is for measuring the vehicle speed by measuring the rotational speed of the tires, etc.

The vehicle information setting parameter DB 42500, like the vehicle information setting parameter DB 40000 according to the second embodiment, contains only the information on the energy equivalent H.

The basic vehicle specification setting unit 38500 accepts the input of such basic vehicle specifications as the vehicle weight W [kg], the emission test cycle mode and the emission test cycle fuel consumption rate R [km/J] from the user through the input unit 3200 and the display unit 3100. Like in the second embodiment, however, the displacement is not necessary.

The energy consumption characteristic calculation unit 39500 determines the energy consumption parameter of the vehicle based on the basic vehicle specifications set by the user in the basic vehicle specification setting unit 38500, the test cycle characteristic DB 37500 and the information of the energy consumption sensor 40500. The type of the energy consumption characteristic type set is the same as in the first embodiment.

Figure 20:
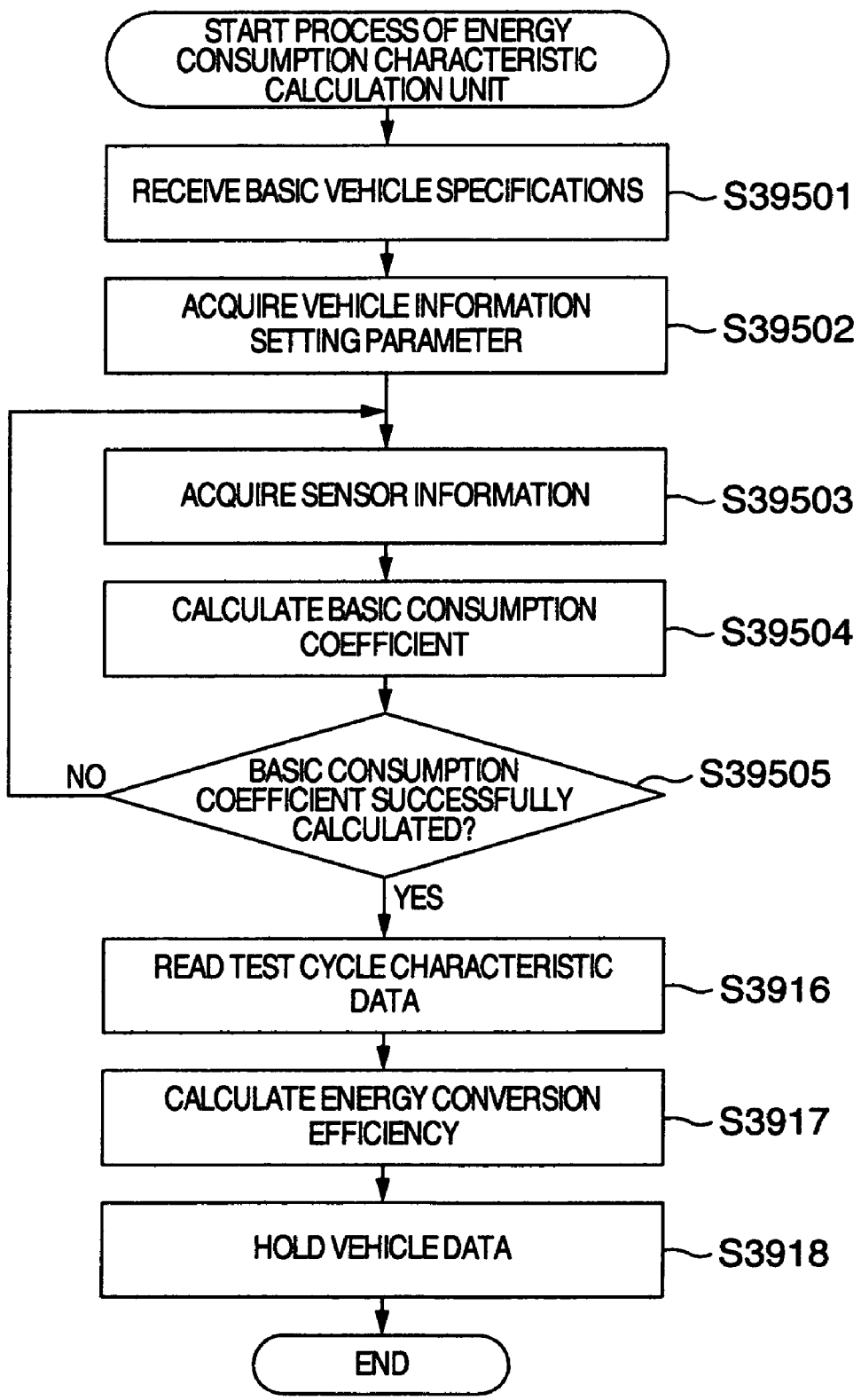
FIG. 20 is a flowchart showing the processes executed in an energy consumption characteristic calculation unit 39500.

FIG. 20 is a flowchart showing the process executed in the energy consumption characteristic calculation unit 39500. According to the third embodiment, the energy consumption characteristic calculation unit 39500 executes the process after the vehicle actually starts to run upon complete execution of the process by the basic vehicle specification setting unit 38500.

The basic vehicle specification receiving process S39501 receives the basic vehicle specifications input by the user in the basic vehicle specification setting unit 38500. Next, in the vehicle information setting parameter acquisition process S39502, the vehicle information setting parameter corresponding to the motive power supply type set in the basic vehicle specifications received is read from the vehicle information setting parameter DB 42500.

In the sensor information acquisition process S39503, the values of the energy consumption and the vehicle speed are acquired from the energy consumption sensor 40500 and the vehicle speed sensor 41500, respectively. The sensor information is acquired for a predetermined time, or 10 minutes, for example.

The basic consumption coefficient calculation process S38504 determines that the idling state prevails in the case where the vehicle speed is 0 km/h, from the values of energy consumption and vehicle speed acquired in the sensor information acquisition process S39503, and the average value of energy consumption acquired in idling state is set as a basic consumption coefficient F. In the case where any data determined as an idling state is not contained in the sensor information acquired for a predetermined time as described above, however, the basic consumption coefficient F is not set.

The process S39505 determines whether the basic consumption coefficient F is successfully calculated or not. Specifically, in the absence of the sensor information determined as an idling state as described above, the calculation is determined as a failure, and the sensor information acquisition process S39503 is executed again to acquire the sensor information. Once the basic consumption coefficient F is successfully calculated, the process proceeds to the test cycle characteristic data reading process S39506.

The test cycle characteristic data reading process S3916, the energy conversion efficiency calculation process S3917 and the vehicle characteristic data holding process S3918 are identical with the corresponding processes, respectively, shown in FIG. 9. The energy conversion efficiency E is calculated in the energy conversion efficiency calculation process S53917. In the vehicle characteristic data holding process S3918, the energy consumption parameter including the basic consumption coefficient F determined in the vehicle characteristic data holding process S3918 and the energy conversion efficiency E determined in the energy conversion efficiency calculation process S3917 on the one hand and the basic vehicle specifications received in the basic vehicle specification receiving process S39501 on the other hand are held as the vehicle characteristic data in the vehicle characteristic data holding unit 4100.

According to the third embodiment, unlike in the first embodiment, the input of the displacement and the measurement of the energy consumption in the idling state of a representative vehicle model are not required in advance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A car navigation system for predicting a fuel consumption rate along a found route using the fuel consumption rate information under a predetermined running condition, the system comprising:
a test cycle characteristic value storage means for storing a test cycle characteristic value as a theoretical value of energy consumption of selected one of a fuel and an electric energy of an automotive vehicle under the predetermined running condition;
a basic vehicle specification setting means for accepting input of basic vehicle specifications including at least a weight and the fuel consumption rate of the vehicle involved under the predetermined running condition;
a vehicle energy consumption characteristic calculation means for estimating a vehicle energy consumption parameter in selected one of an engine and a motor of the vehicle, using the test cycle characteristic value and the basic vehicle specifications;
an energy consumption prediction means for predicting the energy consumption in each road link using the basic vehicle specifications, the vehicle energy consumption parameter, road link information; and
a route search means for seeking a route using, as a link cost, the predicted energy consumption for each road link calculated.

2. The car navigation system according to claim 1, wherein the vehicle energy consumption characteristic calculation means sets, as the vehicle energy consumption parameter, selected one of the electric energy consumption and fuel consumption for idling, and also sets a conversion efficiency from selected one of a fuel combustion energy and an electric energy of the running vehicle into kinetic energy.

3. The car navigation system according to claim 2, wherein the vehicle energy consumption characteristic calculation means estimates selected one an electric energy consumption and a fuel consumption for the vehicle at an idling state from a displacement acquired in the basic vehicle specification setting means, and by substituting an estimation result into a comparison formula between a theoretical fuel consumption rate calculated from the test cycle characteristic value and the vehicle characteristic on the one hand and the input fuel consumption rate on the other hand, calculates the conversion efficiency from selected one of the fuel combustion energy and the electric energy for a running vehicle into kinetic energy.

4. The car navigation system according to claim 2, wherein the vehicle energy consumption characteristic calculation means, by using a plurality of equations as simultaneous equations for theoretical fuel consumption rate calculation in a plurality of emission test cycles, sets the vehicle energy consumption parameter in such a manner as to satisfy the plurality of the equations at the same time or minimize an error.

5. The car navigation system according to claim 2, wherein the basic vehicle specification setting means recognizes an idling state based on the information from a sensor means and sets selected one of an electric energy consumption and a fuel consumption for the idling state.

6. The car navigation system according to claim 1, wherein the basic vehicle specification setting means receives input of the vehicle weight, displacement, an emission test cycle mode and the fuel consumption rate for the emission test cycle as a vehicle characteristic input from a user, and wherein a test cycle characteristic value generating means calculates, from an equation of motion, a running distance, a required time and the energy consumption per unit mass of the vehicle in accordance with an emission test cycle procedure utilizing a prescribed running condition in the emission test cycle as a specified running condition.

7. The car navigation system according to claim 6, wherein the vehicle energy consumption characteristic calculation means estimates selected one of electric energy consumption and fuel consumption for the vehicle at an idling state from the displacement acquired in the basic vehicle specification setting means, and by substituting the estimation result into a comparison formula between a theoretical fuel consumption rate calculated from the test cycle characteristic value and the vehicle characteristic, and the input fuel consumption rate, calculates a conversion efficiency from selected one of a fuel combustion energy and an electric energy for the vehicle at a running state into kinetic energy.

8. The car navigation system according to claim 6, wherein the vehicle energy consumption characteristic calculation means, by using a plurality of equations as simultaneous equations for theoretical fuel consumption rate calculation in a plurality of emission test cycles, sets the vehicle energy consumption parameter in such a manner as to satisfy the plurality of the equations at the same time or minimize an error.

9. The car navigation system according to claim 1, wherein the vehicle energy consumption characteristic calculation means estimates selected one of electric energy consumption and fuel consumption for the vehicle at an idling state from a displacement acquired in the basic vehicle specification setting means, and by substituting the estimation result into a comparison formula between a theoretical fuel consumption rate calculated from the test cycle characteristic value and the vehicle characteristic, and the input fuel consumption rate, calculates a conversion efficiency from selected one of a fuel combustion energy and an electric energy for the vehicle at a running state into kinetic energy.

10. The car navigation system according to claim 1, wherein the vehicle energy consumption characteristic calculation means, by using a plurality inputs of theoretical fuel consumption rates and emission test cycle modes, sets the vehicle energy consumption parameter in such a manner as to satisfy the plurality of the equations at the same time or minimize an error.

11. The car navigation system according to claim 1, wherein the basic vehicle specification setting means recognizes an idling state based on information from a sensor means and sets selected one of an electric energy consumption and a fuel consumption for the idling state.

12. A route search method for a car navigation system to predict a fuel consumption rate along a found route using the fuel consumption rate under a predetermined running condition, the method comprising the steps of:

storing the test cycle characteristic value as a theoretical value of energy consumption of selected one of a fuel energy and an electric energy of an automotive vehicle under the predetermined running condition;

accepting input of basic vehicle specifications including at least a vehicle weight and the fuel consumption rate of the vehicle involved under the predetermined running condition;

estimating a vehicle energy consumption parameter in selected one of an engine and a motor of the vehicle, using the test cycle characteristic value and the basic vehicle specifications;

predicting the energy consumption in each road link using the basic vehicle specifications, the vehicle energy consumption parameter and road link information; and seeking a route using, as a link cost, the predicted energy consumption calculated for each road link.

* * * * *